G. A. WEBB.
JOCKEY OR ROPE GRIP FOR MECHANICAL HAULAGE.
APPLICATION FILED SEPT. 25, 1909.
946,747.
Patented Jan. 18, 1910.
2 SHEETS—SHEET 1.
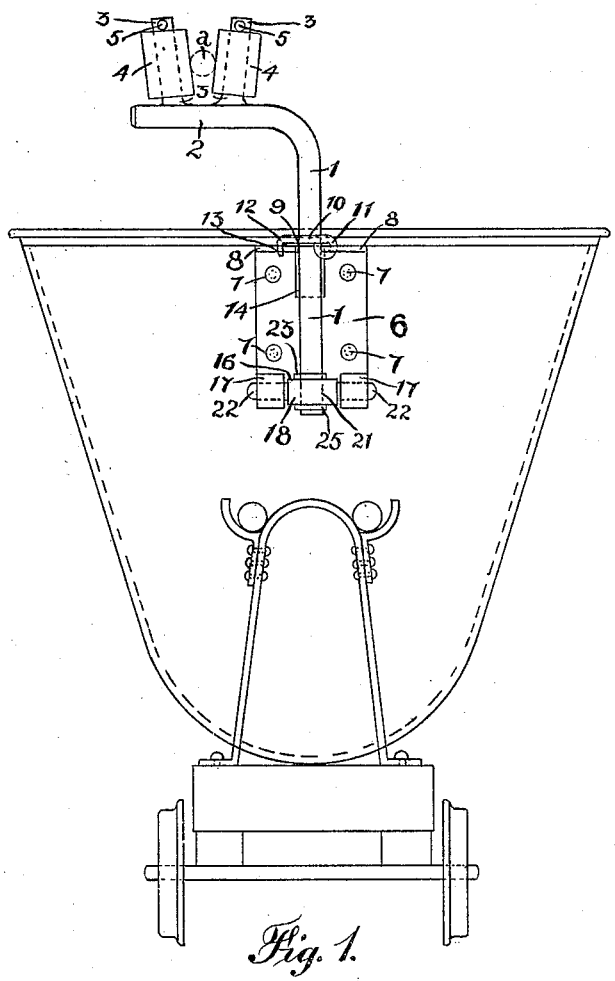
Fig. 1.
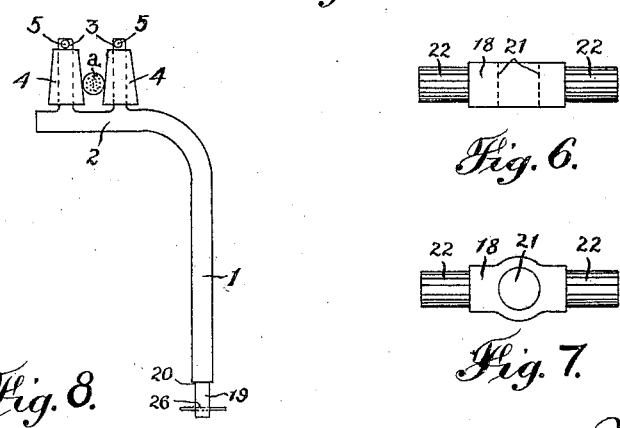
Fig. 8.
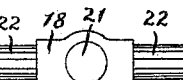
Fig. 6.
Fig. 7.
Witnesses:
Chas. Ovendale
F. Ovendale
Inventor:
George Arthur Webb G. A. WEBB.
JOCKEY OR ROPE GRIP FOR MECHANICAL HAULAGE.
APPLICATION FILED SEPT. 25, 1909.
946,747.
Patented Jan. 18, 1910.
2 SHEETS—SHEET 2.
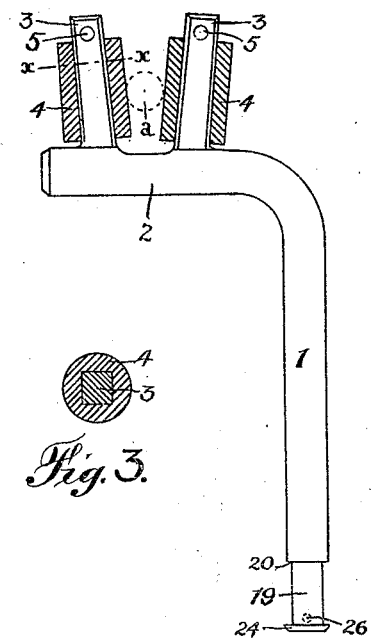
Fig. 3.
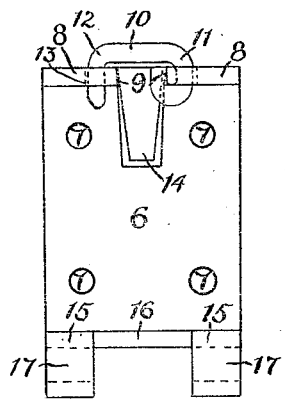
Fig. 4.
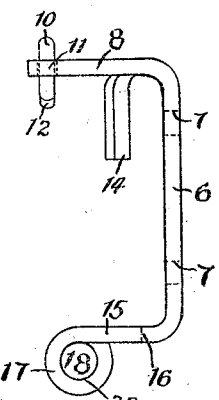
Fig. 5.
Fig. 2.
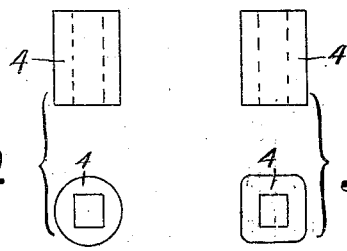
Fig. 9.
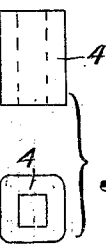
Fig. 10.
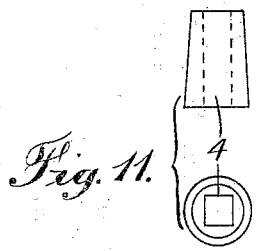
Fig. 11.
Fig. 12.
Witnesses:
Chas. Ovendale
F. Ovendale
Inventor:
George Arthur Webb

UNITED STATES PATENT OFFICE.

GEORGE ARTHUR WEBB, OF RANDFONTEIN, TRANSVAAL.

JOCKEY OR ROPE-GRIP FOR MECHANICAL HAULAGE.

946,747.

Specification of Letters Patent. Patented Jan. 18, 1910.

Application filed September 25, 1909. Serial No. 519,596.

*To all whom it may concern:*

Be it known that I, GEORGE ARTHUR WEBB, a subject of the King of Great Britain, and resident of Randfontein, Transvaal, have invented certain new and useful Improvements in Jockeys or Rope-Grips for Mechanical Haulage, of which the following is a specification.

This invention relates to the devices termed "jockeys" and "rope grips", such as are usually employed for detachably attaching trucks or like vehicles to the endless rope or cable of mechanical haulage arrangements.

One object of my invention is to obviate the necessity experienced with certain of the existing and most commonly adopted types of jockeys, for discarding and renewing the entire jockey when the surfaces thereof which engage or come into contact with the haulage rope become worn.

Another object is to construct and attach the jockey to the truck or vehicle in such a way as to render it unnecessary to disconnect or completely remove the jockey from the vehicle when there is not sufficient head room or space for the jockey to be allowed to remain in its normal vertical position, or if for any other reason it is necessary or desirable to lower it.

By means of my invention these objects are attained in a simple, effective and inexpensive manner.

Both features of my invention will now be fully described by aid of the accompanying sheet of drawings, wherein—

Figure 1 is an end elevation of an ordinary type of mine truck with both features of the invention applied thereto. Fig. 2 is a part sectional elevation of the jockey, shown in Fig. 1, detached and drawn to an enlarged scale. Fig. 3 is a section of Fig. 2 on line x—x. Fig. 4 is a front elevation of the bracket or plate for attaching the jockey to the end of the body of the truck in such manner that it can rotate about its vertical axis, and also hinge or pivot about its lower extremity, to lower the jockey if desired. Fig. 5 is an end elevation of Fig. 4. Fig. 6 is an elevation of the hinge or pivot block for hinging or pivoting the lower end of the jockey stem or shank in the bearings provided therefor at the bottom of the bracket or plate shown in Figs. 4 and 5. Fig. 7 is a plan view of Fig. 6. Fig. 8 is a side elevation of a portion of the jockey stem or shank illustrating a slightly modified form of the invention. Figs. 9 to 12 are sectional elevation and plan views of four different forms of the renewable, non-rotatable wearing member or sleeve.

Referring to the construction of the jockey illustrated in Figs. 1, 2, 3 and 9, it comprises a vertical or substantially vertical shank or stem 1, terminating at its upper extremity in the horizontal or substantially horizontal arm 2. Stem 1 and arm 2 are, as illustrated, preferably fashioned out of one and the same piece of metal, the stem 1 being of circular cross section to admit of its free rotation in its carrying or supporting means as hereinafter described, and the arm 2 of square or any other suitable cross section. Upon the top of the arm 2 are provided two pins, studs or projections 3, which may, as shown, be formed integral with the arm 2, or, alternatively, as independent and suitably attached parts. In the construction represented in these figures pins, studs or projections 3 are splayed outwardly or diverge from the bottom to the top for a purpose hereinafter explained. Surrounding the greater portions of the pins, studs or projections 3, are renewable wearing members or sleeves 4. Sleeves 4 are non-rotatable upon the pins or projections 3 by forming the latter of square, polygonal or any other suitable cross section, and constructing the former with centrally placed holes of corresponding configuration in cross section. In case the pins, studs or projections 3 be splayed or constructed to diverge from the bottom to the top, as depicted in Figs. 1 and 2 (in which figures they are shown of square section) then the renewable, non-rotatable sleeves 4 may be constructed, as shown in Figs. 1, 2, 3 and 9 as parallel sided cylindrical members having holes of corresponding square section extending axially therethrough; or said parallel sided members 4 may, as shown in Fig. 10 be of square external section, preferably slightly rounded at the edges, with centrally placed square or other suitable shaped holes for non-rotatably receiving the pins, studs or projections 3.

The splaying of the pins, studs or projections 3 as will be seen on reference to Figs. 1 and 2 correspondingly inclines the parallel sided members 4 relative to each other, so that the downwardly converging inner or contiguous sides or faces of said members 4 form a downwardly tapering space or passage in which the hauling rope or cable—which is indicated by the dotted circle $a$ in Figs. 1 and 2—is gripped. It will be noted that the non-rotatable sleeves 4 will accommodate haulage ropes of different diameters within a comparatively wide range, the diameter of the rope $a$ obviously determining the position it takes up between the sleeves.

In the upper ends of the projections 3 and above the tops of the members 4 holes 5 may be provided for the reception of split pins or other suitable means for retaining members 4 in position on said projections 3. Any other suitable means may be provided for maintaining the members in place upon their projections 3. If desired the edges of projections 3 may be beveled off or rounded as indicated in Fig. 2 with the object of facilitating the operation of placing members 4 in position thereupon.

The outer extremity of the horizontal arm 2 may be rounded and if desired be prolonged or extended, so that it alone will come into contact with or engage the circumferential groove of the ordinary chime or other guide wheel for the haulage rope and prevent contact of the members 4 with said groove, or the peripheral groove of said wheel may be made of such a width that the outer end of arm 2 and the projection 3 and member 4 adjacent to said extremity may pass around it.

It is apparent that by the above described construction each of the members 4 can be arranged so as to present a different contacting and wearing surface for gripping the rope $a$ for each face of its pin, stud or projection 3, by changing the position of the member 4 upon said stud. This admits, in the case of pins, studs or projections 3, of square section as shown, of four different wearing surfaces being obtained for each of both ends of each member 4.

In using the parallel sided non-rotatable members 4, as shown in Figs. 1, 2, 3, 9 and 10, when either of the members is sufficiently worn away to make it desirable to present new contacting or wearing surfaces for gripping the rope $a$, one (or if necessary or desired both) of said members may be removed from the projections 3 and be rotated through an angle of ninety degrees and then replaced upon said projections. This operation can be repeated for either or both of the members 4 until it or they is or are worn on all sides. Thereafter one or both of said members may be inverted on the projections 3, and be subsequently rearranged thereupon to present the several different wearing surfaces provided by the other ends of said members.

In the slightly modified form of the invention illustrated in Fig. 8 the stem 1 is constructed as in the last described construction with the horizontal or substantially horizontal arm 2, and the latter with the pins, studs or projections 3. In this case however, said projections 3 are disposed parallel to each other and vertical or at right angles to the horizontal arm 2. The non-rotatable sleeves 4 in this case are of conical or pyramidical shape. In Fig. 8 and in Fig. 11 said members are shown as truncated right cones, so that the opposing adjacent sides or surfaces form the downwardly tapering opening in which the rope $a$ is gripped.

In Fig. 12 I show a modified form for the members 4 suitable for use with the parallel and vertical projections 3. In this figure said members 4 are shown of truncated pyramidical configuration.

As shown in Fig. 8 projections 3 are of square section and the axial holes provided in the members 4 (see also Figs. 11 and 12) of corresponding transverse section. In this modification members 4 may be retained in position upon their respective projections 3 by means of split pins or their equivalent engaging the holes 5 in the upper ends of projections 3. The tapering members 4, in like manner to the parallel sided members 4 previously described, may be rearranged four (or more or less according to the number of sides or faces provided on the projections 3) times to present different contacting or wearing surfaces for engaging the rope $a$. They cannot, however, be inverted as in the last described construction.

To the attainment of the second object of my invention I provide a bracket or plate 6—see Figs. 1, 4 and 5—which as shown in Fig. 1 is riveted as indicated at 7 and bolted or otherwise rigidly attached to the end of the truck body at or in proximity to the top thereof. Plate or bracket 6 as shown is bent out horizontally at the upper end as indicated at 8, and in said outwardly bent horizontal portion 8 is formed a slot 9 in which the stem 1 of the jockey rests or is normally seated. For the purpose of closing the outer end of slot 9 and retaining the stem 1 in position in slot 9 a hook 10 is provided hinged at one end 11 in portion 8 at one side of the slot 9 and at the other end fashioned into a hook or hook-shaped projection 12 which is placed in engagement with a hole 13 formed in portion 8 at the other side of the slot. That part of the horizontal portion 8 which is cut to form the slot 9, may as shown at 14, be bent downwardly into a more or less vertical position, and be suitably curved transversely as shown in Fig. 5 to form a bearing for the stem 1. The bracket or plate 6 is also bent outwardly at the bottom more or less horizontally as indicated at 15, said horizontal portion being partially cut away as indicated at 16. The ends of part 15 are curved downwardly or constructed to form bearings 17 at the sides for a hinge or pivot block 18—see Figs. 6 and 7—with which the lower extremity of the stem 1 revolubly engages. For this purpose the lower end of the stem may as shown more particularly in Fig. 2 be constructed with a reduced part 19 forming a shoulder 20. Part 19 is adapted to fit a hole 21 formed at the center of the pivot block 18 and the latter is rounded at the ends as indicated at 22 to form the journals for bearings 17.

23 in Fig. 1 represents a washer which is preferably placed between shoulder 20 and the top of the pivot block 18. The lower end of the stem may as indicated at 24 in Fig. 2 be riveted over another washer 25—see Fig. 1—placed around part 19 beneath the pivot block 18. Instead of riveting the part 19 over washer 25 as indicated at 24 a split pin or its equivalent may be provided and passed through a hole 26 in the end of part 19 beneath block 18 for preventing disengagement of the stem 1 and said block 18. If desired a ball or other universal joint may be provided at the point of connection between the stem 1 and bracket 6. By fashioning bracket 6 out of one piece of metal and curving the sides of portion 15 to form the bearings 17 for pivot block 18, it necessitates said latter member (18) being arranged in position before bending the parts 17 around the journals 22. In order to obviate this, and to permit of the several parts being more readily assembled in position, the bracket or plate 6 may be constructed in two (or more) more or less equal vertical parts. In this case instead of utilizing part 14 to form a bearing for the stem 1 a separate suitably shaped part may be provided and be bolted, riveted or otherwise secured in convenient position to the two part bracket or plate 6 and vehicle body, said separate part in such case serving to attach or to assist in attaching the halves of the bracket or plate 6 to the end of the vehicle body.

The non-rotatable renewable wearing members or sleeves 4 may be made of any suitable metal or alloy preferably a metal or alloy softer than the metal of which the hauling rope or cable $a$ is manufactured, this with the object of preventing excessive wear and tear on the rope or cable $a$. Alternatively the said members may be manufactured in any suitable manner from compressed paper, fiber, leather, pulp or the like. If manufactured from any of the last mentioned materials then the members may be provided with metal bushings adapted to fit the projections 3, and said bushings be provided at their extremities with flanges or projections overlapping the ends of said members, or said members may be protected top and bottom by means of disks or plates riveted or otherwise connected together or to the members and to the flanges of the bushings if the latter are provided. Such members may be made either with parallel or tapered external surfaces to engage the rope or cable $a$.

What I claim as my invention and desire to protect by Letters Patent is:—

1. A rope grip comprising a shank and an arm, the latter having two projections, and a pair of non-rotatable, renewable wearing members or sleeves completely surrounding said projections as set forth.

2. A rope grip comprising a revoluble shank and arm, the latter having two projections, and a pair of non-rotatable, renewable wearing members or sleeves completely surrounding said projections as set forth.

3. A rope grip comprising a revoluble shank and arm, the latter having two projections, and a pair of non-rotatable, renewable wearing members or sleeves completely surrounding said projections and forming between them a downwardly tapering space or passage in which the rope is gripped, as set forth.

4. A rope grip comprising a revoluble shank formed at its upper end into a substantially horizontal arm, the latter having a pair of projections, and a pair of non-rotatable, renewable wearing members or sleeves completely surrounding said projections and forming between them a downwardly tapering space or passage in which the rope is gripped, and means for retaining the wearing members or sleeves in position on the aforesaid projections as set forth.

5. A rope grip comprising a revoluble shank terminating at its upper end in a substantially horizontal arm, the latter being provided at the top with a pair of projecting pins, a pair of non-rotatable, renewable wearing members or sleeves completely surrounding said pins and forming between them a downwardly tapering space or passage in which the rope is gripped, and means engaging holes in the upper ends of the pins above the wearing members or sleeves for retaining the latter in position, as set forth.

6. A rope grip comprising a shank and a connected arm, the latter having two projections formed with a plurality of flats or faces, and a pair of non-rotatable, renewable wearing members or sleeves completely surrounding said projections, as set forth.

7. A rope grip comprising a revoluble shank and a connected arm, the latter having two projections formed with a plurality of flats or faces, and a pair of renewable wearing members or sleeves, completely and non-rotatably surrounding said projections and having a corresponding number of internal flats or faces, as set forth.

8. A rope grip comprising a revoluble shank and a connected arm, the latter having two projections formed with a plurality of flats or faces, and a pair of renewable wearing members or sleeves, completely and non-rotatably surrounding said projections and having a corresponding number of internal flats or faces, and forming between them a downwardly tapering space or passage in which the rope is gripped, as set forth.

9. A rope grip comprising a revoluble shank and a connected arm, the latter having two projections formed with a plurality of flats or faces, and a pair of renewable wearing members or sleeves, completely and non-rotatably surrounding said projections and having a corresponding number of internal flats or faces, and forming between them a downwardly tapering space or passage in which the rope is gripped, and means for retaining the wearing members or sleeves in position on the aforesaid projections, as set forth.

10. A rope grip comprising a revoluble shank terminating at its upper end in a substantially horizontal arm having a pair of projecting pins formed with a plurality of flats or faces, and two renewable wearing members or sleeves, completely and non-rotatably surrounding said projections and having a corresponding number of internal flats or faces and forming between them a downwardly tapering space or passage in which the rope is gripped, and means engaging holes in the upper ends of the pins above the wearing members or sleeves for retaining the latter in position, as set forth.

11. A rope grip comprising a shank, capable of rotating about a vertical axis and of hinging at its lower extremity about a horizontal axis, and a connected arm, the latter having two projections formed with a plurality of flats or faces, and two renewable wearing members or sleeves, completely and non-rotatably surrounding said projections, and having a corresponding number of internal faces and forming between them a downwardly tapering space or passage in which the rope is gripped, and means for retaining the wearing members or sleeves in position on the aforesaid projections, as set forth.

12. A rope grip comprising a shank and a connected arm having a pair of projections, and two non-rotatable, renewable wearing members or sleeves completely surrounding said projections, means for attaching the shank to the vehicle so that it can rotate about a vertical axis and hinge at its lower end about a horizontal axis, and means for retaining the shank in its vertical position, as set forth.

13. A rope grip comprising a shank and a connected arm having a pair of projections formed with a plurality of flats or faces and two non-rotatable, renewable wearing members or sleeves completely surrounding said projections and having a corresponding number of internal flats or faces and forming between them a downwardly tapering space or passage in which the rope is gripped, and means for attaching the grip to the vehicle comprising a part fixed to the vehicle and constructed in its upper portion to provide a bearing for the shank and in its lower portion to provide a further bearing, a rotatable member in said further bearing to which member the shank is revolubly connected, as set forth.

14. A rope grip comprising a shank and a connected arm having a pair of projections formed with a plurality of flats or faces and two non-rotatable, renewable wearing members or sleeves completely surrounding said projections and having a corresponding number of internal flats or faces and forming between them a downwardly tapering space or passage in which the rope is gripped, and means for attaching the grip to the vehicle comprising a part fixed to the vehicle and bent outwardly at the top to form a horizontal portion in which is formed a slot in which fits the shank and in which the piece cut to form the slot is used as a bearing for the shank, said part being also bent outwardly at the bottom to form a bearing, a member rotatable in said bearing to which member the shank is revolubly connected, and a catch hinged to the first mentioned part for closing the slot to retain the shank in a vertical position, as set forth.

In testimony whereof I have signed my name to this specification in the presence of two subscribing witnesses.

GEORGE ARTHUR WEBB.

Witnesses:
 CHAS. OVENDALE,
 MAUD POPE.